April 24, 1934.  K. K. PALUEFF  1,956,400
VOLTAGE INDICATING MEANS FOR TRANSFORMERS
Filed Sept. 28, 1933
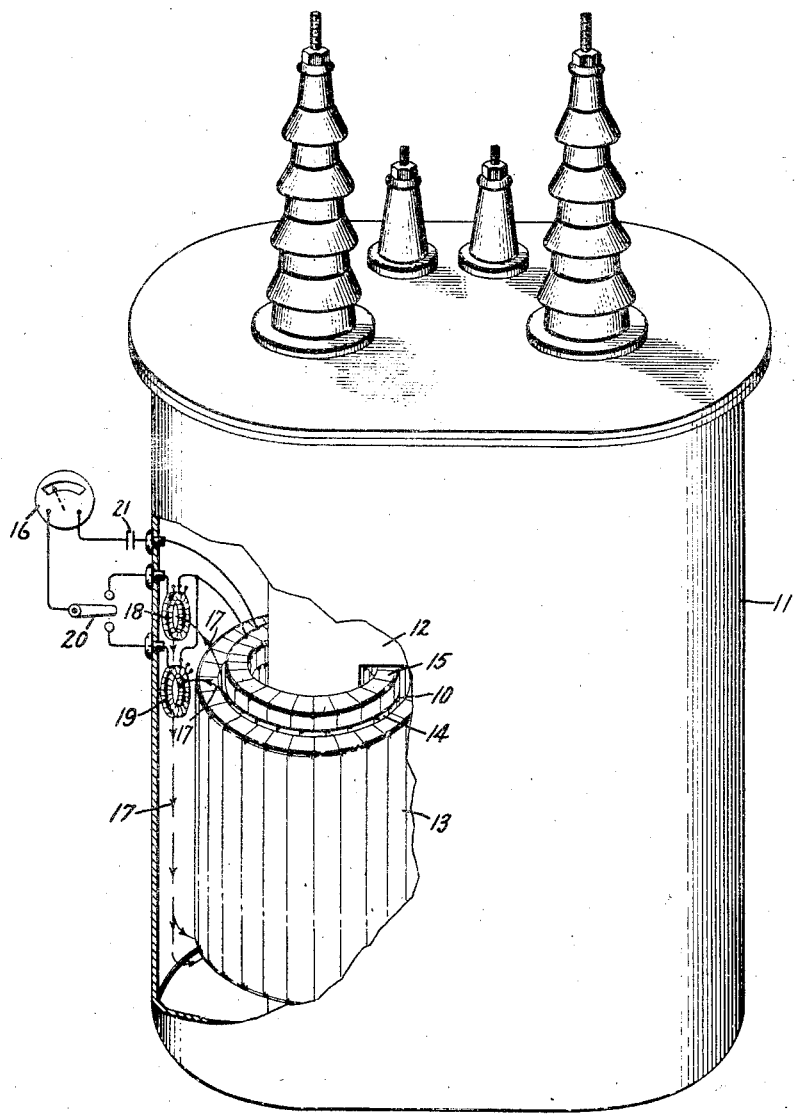
Inventor:
Konstantin K. Palueff,
by Harry E. Dunham
His Attorney.

Patented Apr. 24, 1934

1,956,400

UNITED STATES PATENT OFFICE 1,956,400

VOLTAGE INDICATING MEANS FOR TRANSFORMERS

Konstantin K. Palueff, Pittsfield, Mass., assignor to General Electric Company, a corporation of New York Application September 28, 1933, Serial No. 691,337

4 Claims. (Cl. 172—245)

My invention relates to voltage indicating means for power transformers. It is often desirable to be able to determine the voltage of a transformer winding while the transformer is in operation. The voltages of many power transformer windings are too high, however, for indicating instruments. If the high voltage is reduced by a special small voltage reducing transformer, the voltage indications of the instrument will be inaccurate because of phase angle and ratio errors in the voltage reducing transformer. These phase angle and ratio errors are inherently smaller in a large power transformer than in a small voltage transformer but the excessive cost and size of an additional large power transformer would prohibit its use merely for voltage indicating purposes. The use of a separate transformer is avoided in accordance with the invention by providing a low voltage winding on the same transformer core with the high voltage winding or windings of which the voltage is to be indicated. While the phase angle and ratio errors with this arrangement are considerably smaller than with a separate small voltage transformer, errors in the voltage of the low voltage winding will be caused by the leakage flux produced by interchange of power between the high voltage power windings of the transformer. The invention provides means for correcting the errors due to the power leakage flux and the general object of the invention is to provide an improved arrangement of this nature for indicating the voltages of high voltage windings of power transformers.

The invention will be more fully explained in the following description taken in connection with the accompanying drawing which shows a high voltage power transformer provided with voltage indicating means in accordance with the invention, part of the transformer casing being broken away to show details.

The transformer 10 shown in the drawing has a casing 11 formed of metal such as sheet steel. The casing 11 may be filled or partially filled with suitable insulating and cooling liquid. The transformer 10 has a magnetic core 12 and two main high voltage power windings 13 and 14 on the core. A small low voltage winding 15 of few turns as compared with the number of turns in either of the windings 13 and 14 is also provided on the core 12. This winding 15 is connected to a voltmeter 16.

If all the magnetic flux were confined to the core 12, the three windings 13, 14 and 15 would all surround the same flux and their voltages would always be accurately proportional under all load conditions. The voltmeter 16 could then be calibrated to indicate the voltage of either of the high voltage power windings 13 or 14. However, the leakage flux caused by the interchange of power between the windings 13 and 14 does not link the three windings 13, 14 and 15 equally and the voltages of these windings are therefore not accurately proportioned under different load conditions. In order for the voltage of the winding 15 to be accurately proportional to that of one of the other windings 13 or 14, it would have to occupy the same position on the core but this is, of course, physically impossible. It is even impracticable to locate the winding 15 in approximately the position for maximum accuracy with respect to either of the windings 13 and 14. In accordance with the invention, therefore, the winding 15 is located at any convenient place on the core and means are provided for correcting the errors so that the voltmeter 16 will indicate substantially accurately the voltage of either of the high voltage windings 13 and 14.

The casing 11 of the transformer 10 is formed as usual of magnetic material such as sheet steel. Part of the leakage flux 17 indicated by broken lines in the drawing will enter the magnetic casing 11 near one end of the windings and leave the casing near the other end of the windings. Two small corrective coils or windings 18 and 19 are mounted in the path of the leakage flux 17 between the transformer and the casing wall. The coils 18 and 19 should be placed approximately at right angles to the direction of the flux so that the flux will induce voltages in them. A switch 20 is arranged to connect either of the coils 18 and 19 in series with the winding 15 and the voltmeter 16. The corrective coils 18 and 19 are provided to correct the voltmeter reading for the two windings 14 and 15 respectively and if the two windings 14 and 15 operate at different voltages then two scales will of course be necessary on the voltmeter.

The voltages induced in the corrective coils 18 and 19 are proportional to the load current and are usually substantially in phase with the error caused by the leakage flux in the voltage of the voltmeter winding 15. In some cases, it may be desirable to provide a condenser 21 in the voltmeter circuit to correct the phase angle error due to the inductance in the voltmeter circuit. By designing each of the corrective coils 18 and 19 to have the proper number of turns and to surround the proper cross-sectional area of the leakage flux, the voltage induced in the coil by the leakage flux will be exactly equal to the error caused by the leakage flux in the winding 15 with respect to the corresponding power winding 13 or 14. The exact density of the leakage flux at any point may be rather difficult to calculate accurately and the coils 18 and 19 may be provided with taps as shown in the drawing so that the number of effective turns in each coil may be adjusted and corrected by trial if necessary.

The voltage of either of the high voltage windings 13 and 14 may be indicated under any load conditions by connecting the corresponding corrective coil 18 or 19 and the voltage winding 15 to the voltmeter 16, the combined voltages of the voltage winding and corrective coil in either case being always proportional to the voltage of the high voltage winding.

The voltage indicating arrangement is economical and the indication is even more accurate than that obtained by the usual separate voltage transformer arrangement.

The invention has been explained by describing and illustrating a particular arrangement thereof but it will be obvious that changes may be made without departing from the spirit of the invention and the scope of the appended claims.

What I claim as new and desire to secure by Letters Patent of the United States, is:

1. The combination with a power transformer having a high voltage winding of a voltage winding on the core of said transformer, a corrective coil in the path of a portion of the leakage flux, and a voltmeter, said voltage and corrective windings being connected in series to said voltmeter and their combined voltage being proportional to that of said high voltage winding.

2. The combination with a power transformer having a high voltage winding of a voltage winding on the core of said transformer, a corrective coil in the path of a portion of the leakage flux, a condenser, and a voltmeter, said voltage and corrective windings and said condenser being connected in series to said voltmeter, and the combined voltage of said voltage and corrective windings being proportional to that of said high voltage winding.

3. The combination with a power transformer having a high voltage winding, of a magnetic casing for said transformer, a voltage winding on the core of said transformer, a corrective coil in the path of a portion of the leakage flux between said transformer and its casing, and a voltmeter, said voltage and corrective windings being connected in series to said voltmeter and their combined voltage being proportional to that of said high voltage winding.

4. The combination with a power transformer having two high voltage windings of a voltage winding on the core of said transformer, two corrective coils each in the path of a portion of the leakage flux, a voltmeter, and means for connecting either of said corrective coils and said voltage winding in series to said voltmeter, the combined voltage of said voltage winding and one of said corrective coils being proportional to that of one of said high voltage windings and the combined voltage of said voltage winding and the other corrective coil being proportional to that of the other high voltage winding.

KONSTANTIN K. PALUEFF.